United States Patent [19]
Reimer

[11] 3,866,578
[45] Feb. 18, 1975

[54] ROTARY ENGINE

[76] Inventor: Richard W. Reimer, 7915 Croesus, Los Angeles, Calif. 90001

[22] Filed: Jan. 14, 1974

[21] Appl. No.: 433,283

[52] U.S. Cl............... 123/8.45, 418/61 R, 418/133, 418/148, 418/266
[51] Int. Cl............................................ F02b 55/14
[58] Field of Search......... 123/8.45, 8.47; 418/61 R, 418/61 A, 61 B, 133, 148, 266

[56] References Cited
UNITED STATES PATENTS

| | | | |
|---|---|---|---|
| 3,132,632 | 5/1964 | Kehl | 123/8.45 |
| 3,464,395 | 9/1969 | Kelly | 123/8.45 |
| 3,723,033 | 3/1973 | Tauscher | 123/8.45 X |
| 3,765,379 | 10/1973 | Thomas | 123/8.45 |

*Primary Examiner*—Clarence R. Gordon
*Attorney, Agent, or Firm*—Dominick Nardelli

[57] ABSTRACT

A rotary engine is disclosed, primarily of the internal combustion type, having a stator cavity which is preferably cylindrical in form, a thick wall tubular rotor with multiple free-floating vanes disposed to rotate within said stator on an axis that is eccentric to the stator, an internal gear mounted on each end of said rotor with a drive shaft having external gears, disposed through the rotor and meshing with the internal gears. The drive shaft extends through the end walls in bearing relationship so that the rotor is held in an off-center relationship with the stator. Between the rotor and the respective internal gears is disposed a fixed wall having an eccentric opening with a diameter that is less than the external diameter of the rotor. Suitable bearing seals are placed between the rotor and the wall to allow the rotor to rotate relative to the wall and stator while maintaining a pressure differential across the seals. Suitable intake and exhaust ports are provided through the walls of the stator so that a combustive mixture enters therein and exhaust products exit therefrom.

10 Claims, 3 Drawing Figures

ROTARY ENGINE

FIELD OF THE INVENTION

This invention relates to a rotary engine of the eccentric rotor and multiple free vane type.

BACKGROUND OF THE INVENTION

Several rotary type engines have been developed, for example, the Wankel engine, which, having a lobe type rotor, is inherently difficult and expensive to balance. In addition, U.S. Pat. No. 3,452,725 teaches the use of a cylindrical rotor, rotating off center with respect to the stator. That patent also teaches that the axis of rotation of the rotor should be fixed. This inherently produces problems at high revolutions per minute (RPM) since any slight imbalance therein will produce large eccentric forces which will cause the engine to vibrate and wear.

OBJECTS OF THE INVENTION

An object of this invention is to provide a rotary engine having a cylindrical rotor that is capable of floating about its axis of rotation so that the center of mass is capable of coinciding with its axis of rotation.

Another object is to provide a rotor with internal gears that mesh with a drive shaft with external gears so that the high compression side of the rotor causes the gears to mesh.

Another object of this invention is to provide internal gears on each side of a thick wall, cylindrical rotor, which bears mesh with spaced external gears on a drive shaft to provide an economical assembly.

Another object of this invention is to provide a fixed sealing wall with an eccentric round hole disposed between the rotor and each internal gear of the above object.

Another object of this invention is to provide effective self-lubricating seals between the free-floating vanes and between the rotor and fixed wall.

These and other objects and features of advantage will become more apparent after studying the following detailed description of the preferred embodiment of my invention, together with the appended drawings.

Figure 1:
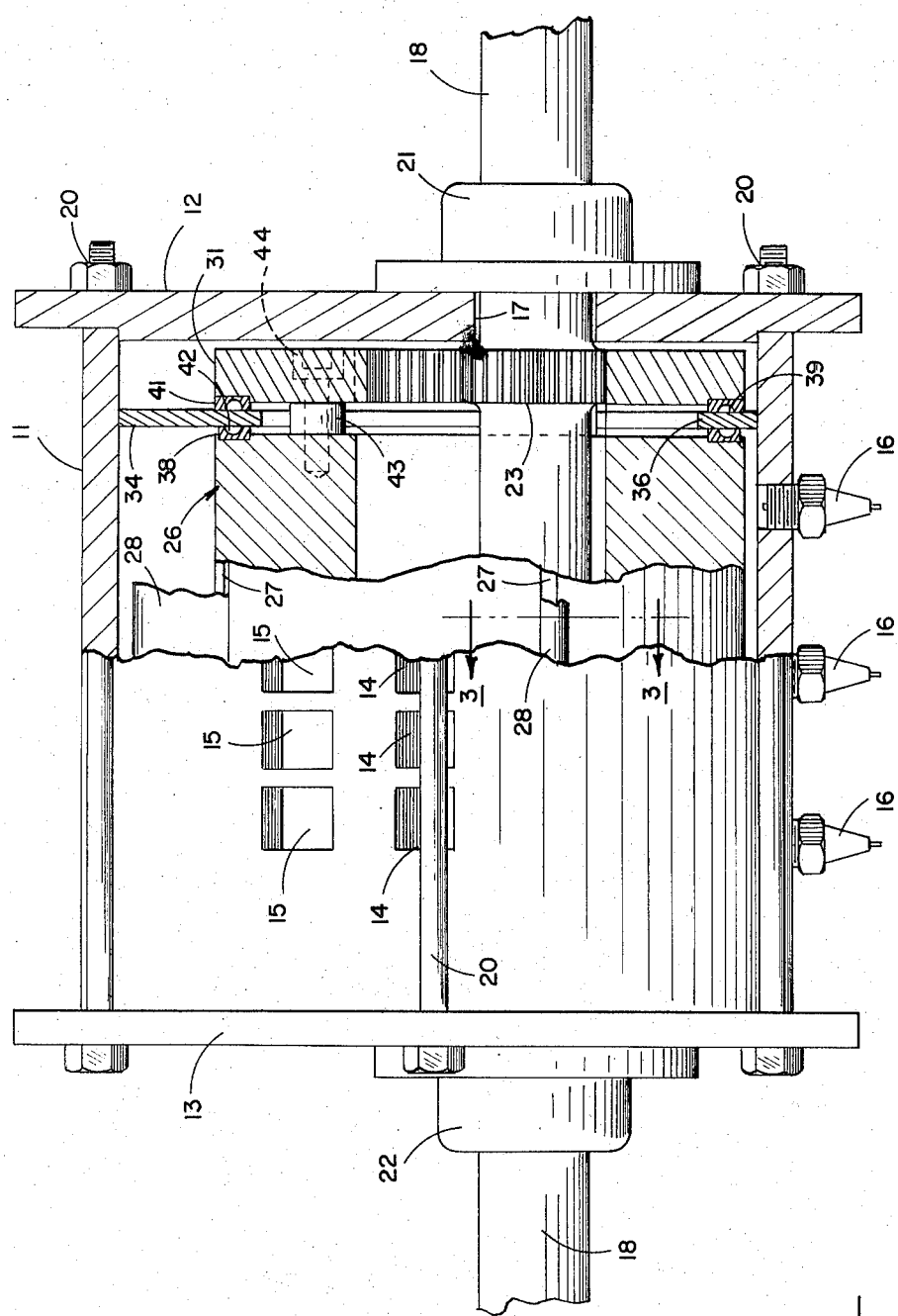
FIG. 1 is an axially parallel view, in partial section, of my novel rotary engine shown schematically.
Figure 2:
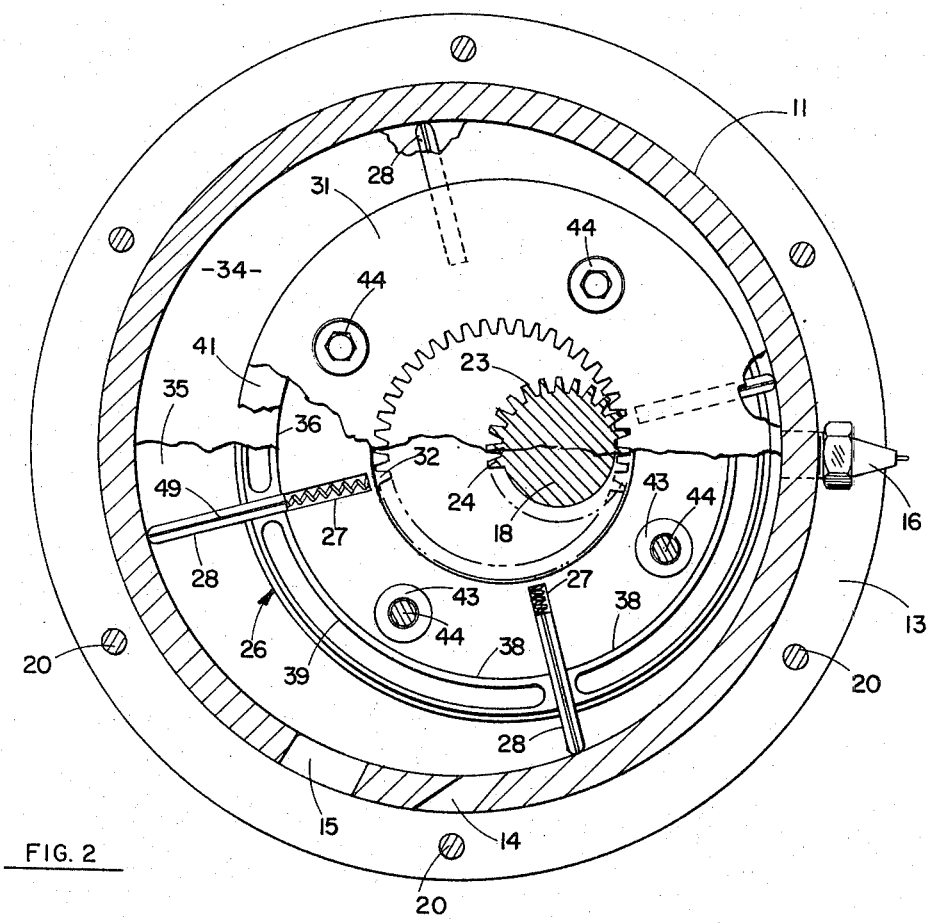
FIG. 2 is a section of the engine of FIG. 1, taken on various planes normal to the axis thereof.

DETAILED DESCRIPTION OF THE DRAWINGS:

Referring to the drawings, and to FIGS. 1 and 2 in particular, the rotary engine has a stationary stator consisting of a cylindrical tubular sleeve 11 with cover plates 12 and 13 at respective ends thereof. Suitable bolt means 20 is provided to hold the cover plates in place. Through sleeve 11 are formed two rows of ports, exhaust ports 14 and intake ports 15. The necessary manifolds (not shown) will be coupled to these ports to conduct the combustible mixture to and conduct the exhaust gases away, as is well known in the art. Also through sleeve 11 are disposed one or more sparkplugs 16 axially aligned. Through each cover plate are formed eccentric holes, such as hole 17 in cover plate 12, and the hole is displaced towards the sparkplugs 16. A drive shaft 18 passes through the holes 17. Suitable bearings 21 and 22 are provided mounted on the respective cover plates 12 and 13, to allow the shaft 18 to rotate. One end of the drive shaft 18 may be connected, for example, to the drive wheels of a vehicle, while the other end may be connected to drive engine accessories, not shown. On the drive shaft 18 are formed two pinion gears such as pinion gear 23, for reasons that will be explained hereinafter. One should remember that although one side of the engine is shown in section, the covered portion of the engine is preferably similarly constructed. Within the stator is disposed a symmetrical rotor 26 having a relatively thick wall and is cylindrical in shape. The rotor 26 is disposed eccentric with respect to the sleeve 11 and drive shaft 18. The rotor 26 is provided with suitable radially disposed slots 27 and in this embodiment the four slots 27 are equally spaced around the stator. Within each slot is disposed a free-floating vane 28 which will be more fully described hereinafter.

The rotor 26 is free floating within the stator and is held in the respective position as shown in the following manner, while still allowing the rotor to rotate: On respective ends of the rotor 26 are mounted to rotate therewith rotor caps 31 and 32, each having an internal gear that meshes with the respective pinion 23 and 24 on shaft 18. For reasons that will become apparent hereinafter, the pitch diameters of the pinion gears are less than the pitch diameters of the internal gears. For obvious reasons, the pitch diameters of both pinion gears are the same and the pitch diameters of both internal gears are the same. Between the respective rotor caps 31 and 32 and the rotor 26 are two stator side walls 34 and 35 (FIG. 2), each being disc-like in shape, with a circular periphery to match the shape of the sleeve 11 and a circular eccentric hole or opening 36. The stator side walls 34 and 35 are fixed to the sleeve 11, preferably in a manner to be described hereinafter. Between the rotor 26 and the respective side walls 34 and 35 are sector seals 38, each extending approximately 90 degrees respective vanes 28. The seals 38 are made, for example, of a spring-type metal, and have a groove 39 formed therein, as shown, so that a relatively small rubbing area is provided between the seal and the side wall. This feature is well known in the art, to provide an effective seal. Between the respective rotor caps and the stator side walls are disposed ring seals, such as ring seal 41 (FIG. 1). Ring seal 41 has formed on one side a circumferential groove 42 for substantially the same reasons sector seals 38 have grooves 39 formed therein. Ring seal 41 is disposed in a suitable circumferential peripheral recess in respective cap 31, as shown, to hold it in place, and, since sector seals 38 cannot be formed into a continuous ring, a circumferential recess is formed in the stator spaced radially inward, as shown in FIG. 1, to lock the stator seals 38 in place. Between the respective caps and rotor are placed spacers, such as spacer 43, to prevent an excess of deformation of the seals when bolts 44 are tightened.

The engine operates as follows: This engine, as all internal combustion engines, is not self-starting. To start the engine, shaft 18 must be rotated by suitable means, not shown, in a clockwise direction, as viewed in FIG. 2. This causes the rotor 26 also to rotate clockwise, causing the vanes 28, one at a time, to sweep past, first the exhaust ports and then the intake ports. Since the intake ports are located preferably less than 135° from the sparkplugs 16, the moving chamber bounded by two adjacent vanes 28, sleeve 11 and rotor, increases in size, sucking in a combustible mixture. After the adjacent vane 28 passes the intake ports 15, the compression operation occurs. Then, when two respective vanes are substantially equidistant on either side of the sparkplugs 16, the plugs are fired and burning occurs. Timing equipment for timing the firing of the sparkplugs is not shown and may be used to time the firing for efficient operation. The high pressure exhaust gases now exert a force against the forward vane, causing that vane to move toward the exhaust ports 14, which are located preferably 90° from the plugs 16. The prior art teaches the best location for the intake and exhaust ports should be with respect to each other and to the plugs 16. This force against the vanes, and in turn the rotor, is transmitted to the shaft 18 through the gears.

One can see that the higher pressures between the sleeve and the rotor near the plugs and on the opposite side of the rotor keeps the gears in mesh. This provides a pneumatic cushion for the rotor to cause any vibrations due to any imbalancing force to become dampened. In addition, since the shaft is not integral with the rotor, it can have a relatively smaller diameter, thereby enabling it to rotate at highter RPMs than a shaft with larger RPMs before any degrading effect is observed. Since the rotor is made inherently symmetrical, the rotor is easily balanced and if desired the pitch diameter of the internal gears can be made only slightly larger than the pitch diameter of the external gears so that the shaft and rotor rotate at approximately the same RPM. The only requirement is that the rotor be allowed to float relative to the stator and the drive shaft.

Figure 3:
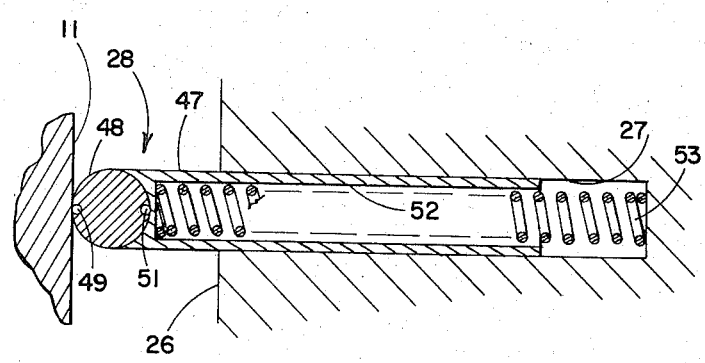
FIG. 3 is an enlarged section of the free-floating vane taken substantially on line 3—3 of FIG. 1, showing the vanes in greater detail.

Since internal and external gearing has been shown to produce added advantages over similar type engines of the prior art, which have integral rotors and shafts, as taught in U.S. Pat. No. 3,452,725, I have found a way to fabricate my engine economically. The combination of rotor caps 31 with the rotor 26 eliminates the need for providing internal gearing within the rotor. Therefore, in my invention, the rotor can be made of a light metal, such as aluminum alloy, and the rotor caps can be made of, for example, hard steel, the same as the shaft, for better wear and durability. The side walls 34 add the advantage of isolating the rotor caps and bearings from the hot combustion products which are very corrosive. Now the rotor caps and shaft can be effectively lubricated and cooled as oil can be pumped through one cover plate 12 and out the other by suitable means, not shown. Centrifugal force will throw the oil against the seals 38 and 41 and provide an oil film between the journalled surfaces. In addition, an oil film will be formed between the vanes and the respective side walls 34. To insure adequate lubrication between the vanes and the stator sleeve 11, the vanes are preferable made as shown in FIG. 3. The rotor 26 has four equally radially spaced slots 27. The vanes are formed of an elongated rectangular flat member 47 having a small dimension that allows it to slide radially within the respective slot 27 and its largest diameter to extend from one side wall 34 to the other side wall 35, as will be described. The third dimension should be sufficient to allow the member to be retained within the slot 27 as the rotor revolves around its axis. The three exposed sides of member 47 that are adjacent the respective side walls 34 and 35 and sleeve 11 are formed with a concave semicircular recess wherein a hardened round steel U-shaped seal 48 is disposed. The seal 48 is provided with a suitable oil groove 49 extending its full length opposite member 47. In addition, a similar oil groove 51 is provided between the seal and the member 47. The member 47 is provided with a suitable blind hole 52 in which a suitable spring 53 is disposed to insure that the vanes bear against the sleeve when the engine is stopped. This insures quicker starting for obvious reasons. Oil is allowed to flow up the narrow groove to provide a lubricating film where needed. The grooves are small, preferably to reduce the danger of oil flashing within the rotor.

The engine is preferably assembled as follows: The rotor 26 is fitted with an assembled vein 28 in each slot 27 and sector seals 38 are inserted into the circumferential groove on one end of the rotor. One side wall is placed over the sector seals, making sure that its eccentric hole 36 is substantially concentric with the rotor 26. Exact alignment is not essential. Then one ring seal 41 is placed on the side wall and one rotor cap 31, with the necessary spacers 34, are positioned thereon and bolts 44 are inserted and tightened. The spacers 43, as described above, are of such a size so that the seals 38 and 41 bear firmly against the side wall 34. As one skilled in the art knows, excessive pressure will cause excessive wear and insufficient pressure will degrade the sealing effect. The other end of the rotor 26 is fixed in a similar manner; however, care should be taken that both side walls 34 and 35 are aligned as best as possible. The overall diameter of the side walls 34 is such that when the side walls 34 and sleeve 11 are at the same temperature, the diameter of the side walls is slightly larger than the internal diamter of the sleeve. Therefore to assemble the rotor into the sleeve, the assembled rotor is placed in dry ice or at sufficiently low temperature to allow the external diameter of the side walls to shrink smaller than the internal diameter of the sleeve 11. Now, when the assembled rotor and sleeve are at the different temperatures, the rotor can be inserted into the sleeve. When the two reach the same temperature, the side walls 34 inherently become fixed to the sleeve. The drive shaft is put in place and both plate covers 12 and 13 are bolted in place. Of course, the plate covers 12 and 13 are placed so that the rotor is nearer the sparkplug side of the sleeve than any other place.

Having described the preferred embodiment of my invention, one skilled in the art, after studying the above disclosure, can conceive other embodiments without departing from the spirit of my invention. Therefore the invention is not to be considered limited to the disclosed embodiment, but includes all embodiments falling within the scope of the appended claims.

I claim:

1. A rotary engine comprising:
    a tubular sleeve and a pair of cover plates disposed on opposite sides thereof, and forming a working cavity;
    each cover plate having an eccentric hole aligned with the hole in the other plate;
    an axially symmetrical rotor assembly disposed within said sleeve and between said cover plates, and having an axially symmetrical opening therethrough;
    said rotor assembly having a plurality of radially disposed slots disposed therearound;

a vane slidably disposed in each one of said slots;

a drive shaft disposed through said rotor and said eccentric holes in said cover plates;

bearing means between each one of said plates and said shaft;

said axially symmetrical opening in said rotor assembly being of a larger diameter than said shaft;

gear means, including an internal gear on said rotor assembly, and a pinion gear on said shaft, wherein the pitch diameter of said pinion gear is of a smaller diameter than the pitch diameter of said internal gear, for coupling said shaft to said rotor assembly so that said rotor assembly is free to float with respect to said shaft.

2. The engine of claim 1 wherein said rotor assembly comprising:

a tubular cylindrical rotor having a cylindrical outer surface and a concentric cylindrical bore therethrough;

a cap mounted at one end of said rotor to rotate therewith and said internal gear being formed on said cap.

3. The engine of claim 2 wherein said rotor assembly further comprising:

another cap formed with another internal gear mounted at the other end of said rotor to rotate therewith;

said shaft having another pinion gear adapted to mesh with said other internal gear;

a pair of said walls each having a circular opening disposed off center and each side wall rigidly mounted within said sleeve so that one wall is disposed between said rotor and one cap and the other side wall is disposed between said rotor and said other cap; and sealing means disposed between the side walls and the respective caps and rotor.

4. The engine of claim 3 wherein said sealing means comprises:

a circular ring seal disposed between each cap and said respective side wall;

said cap having a circumferential groove to retain said ring seal; and a plurality of sector seals disposed between each side wall and said rotor and extending from one of said vanes to the adjacent vane.

5. The engine of claim 1 wherein said vane includes:

a substantially rectangular member disposed within a respective slot;

said member having a concave recess formed on three exposed sides;

a U-shaped seal disposed within said recess; and spring means urging said member from said respective slot;

said U-shaped seal having an oil groove formed the full length thereof and disposed opposite said member.

6. The engine of claim 3 wherein said vane includes:

a substantially rectangular member disposed within a respective slot;

said member having a concave recess formed on three exposed sides;

a U-shaped seal disposed within said recess; and spring means urging said member from said respective slot;

said U-shaped seal having an oil groove formed the full length thereof and disposed opposite said member.

7. The engine of claim 4 wherein said vane includes:

a substantially rectangular member disposed within a respective slot;

said member having a concave recess formed on three exposed sides;

a U-shaped seal disposed within said recess; and spring means urging said member from said respective slot;

said U-shaped seal having an oil groove formed the full length thereof and disposed opposite said member.

8. The engine of claim 7 wherein said sleeve has a cylindrical bore.

9. The engine of claim 8 wherein:

sparkplug means are provided in said sleeve and disposed closest to the center of said eccentric holes in said cover plates.

10. The engine of claim 9 wherein:

suitably placed intake and exhaust ports are provided through the said sleeve.

* * * * *